United States Patent [19]

Heeren

[11] 3,710,389
[45] Jan. 9, 1973

[54] MICROWAVE BEAM SCANNER CIRCUIT

[75] Inventor: Vernon L. Heeren, Wayland, Mass. 01778

[73] Assignee: The United States of America as represented by the Secretary of the Navy

[22] Filed: Oct. 22, 1970

[21] Appl. No.: 82,890

[52] U.S. Cl. ............................343/7.4, 343/16 M
[51] Int. Cl. ...............................................G01s 9/22
[58] Field of Search .........................343/7.4, 16 M

[56] References Cited

UNITED STATES PATENTS 3,239,836    3/1966    Chubb et al. .....................343/7.4

Primary Examiner—T. H. Tubbesing
Attorney—R. S. Sciascia and L. I. Shrago

[57] ABSTRACT

A "Cosro" antenna arrangement is disclosed in which the scanning rate of the receiving beam may be changed in a relatively small time interval by a scanner which utilizes a rotating vane positioned within a circular wave guide section closed off by a shorting plate. The system utilizes a single receiver, and the transmit beam has a reduced amount of residual scan.

6 Claims, 1 Drawing Figure

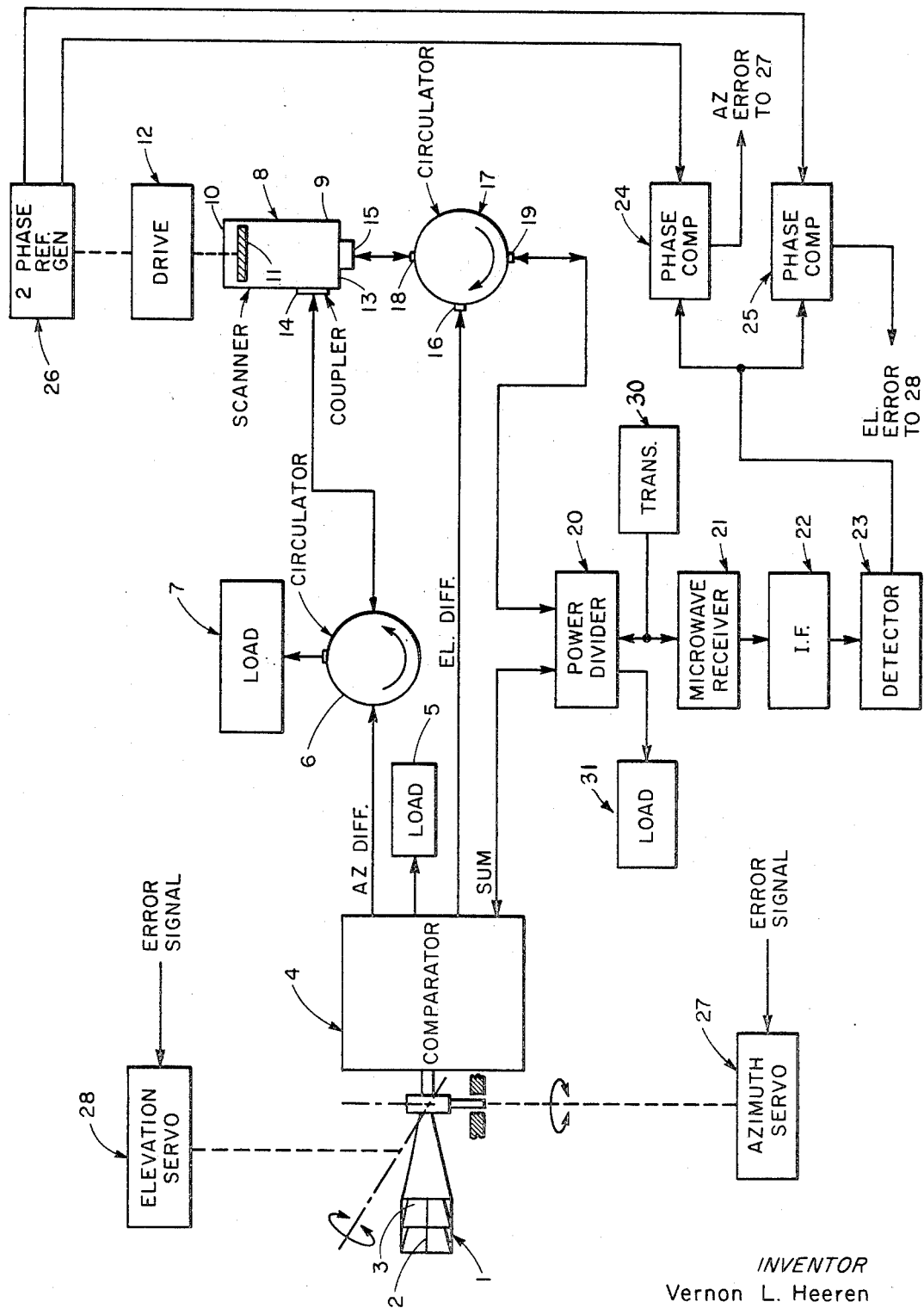

MICROWAVE BEAM SCANNER CIRCUIT

The present invention relates generally to tracking radar apparatus and, more particularly, to an antenna system which provides a conically scanning receive beam with a very nearly nonscanning transmit beam.

Target tracking radar systems are available which contain a provision for conically scanning a directional beam without mechanically nutating the complete antenna assembly or a portion thereof, such as the horn or a subreflector. This type of antenna configuration is called a Cosro antenna, which is an acronym for conically scan receive only.

One of the important advantages of the Cosro system is that because of its utilization of the conical scan technique, the more stable and reliable single receiver system of processing data can be used. The monopulse system, by comparison, requires individual microwave receivers for processing the azimuth and tracking error signals. Each of these error signals must be processed in their receiver without any relative phase or gain drifts. As will be recognized, this requirement imposes a severe restriction on the design of the receivers and greatly increases their cost and complexity.

It is accordingly a primary object of the present invention to provide an antenna system for a tracking radar of the monopulse type which requires only a single microwave receiver for processing all target signals.

Another object of the present invention is to provide a monopulse radar system wherein the necessity for processing the azimuth and elevation error signals in separate receivers is eliminated.

Another object of the present invention is to provide a monopulse radar system in which the scanning rate of the receiving beam may be changed from one frequency to another in a relatively small time interval.

Another object of the present invention is to provide a so-called Cosro antenna arrangement wherein the amount of residual scan in the transmit beam is reduced.

By referring now to the drawing, the sole FIGURE of which is a simplified box diagram of a portion of the monopulse radar system, it will be seen that the apparatus includes a four-quadrant horn 1, subdivided by septums 2 and 3. As is well known, cooperating with this horn is a comparator 4 which compares the relative magnitudes of the signal energy received above and below septum 2 and on either side of septum 3.

This comparator develops (1) an azimuth error or difference signal representing the relative amplitudes of the target echo energy on either side of septum 3, (2) an elevation error or difference signal representing the relative amplitudes of the target echo energy above and below septum 2, and (3) an additional signal proportional to the sum of the target echo energy received in all four quadrants of horn 1. Comparator 4 is provided with a dummy load 5 for absorbing other signals present within the apparatus which are not needed in the signal processing portion of the radar apparatus.

The azimuth difference signal is fed to one port of a conventional circulator 6. This circulator, which has a dummy load 7 connected to another of its ports, is included in the system to minimize the residual scan of the transmitting beam during the transmitting portion of the cycle. The third port of the circulator, the one opposite the input terminal, is connected to a scanner 8. The construction of this scanner and its mode of operation is described in applicant's U.S. Pat. No. 3,622,921 of Nov. 23, 1971. For the purposes of the present disclosure, it is believed sufficient to note that this device consists of a circular wave guide section 9 closed at one end by a shorting plate 10 and containing a conducting vane 11 which is adapted to be rotated by motor 12 about the longitudinal axis of symmetry of the wave guide. In its simplest configuration, vane 11 is spaced one quarter wavelength away from the shorting plate. However, as taught in applicant's copending application, if this vane is mounted within a dielectric disk, the frequency sensitivity of the scanner is reduced. In any case, the vane and the shorting plate behind it coact to form a polarization rotator and, in the case where a linearly polarized incident signal is directed down the circular wave guide, the reflected signal will be rotated through an angle $2\alpha$, where $\alpha$ is the instantaneous angle between the vane and the direction of polarization of the incident signal.

Cooperating with scanner 8 is an orthogonal mode coupler 13 which contains a rectangular wave guide section 14 properly orientated and mounted on the sidewall of the circular wave guide section and an end rectangular wave guide section 15 connected to the remote end of this circular section. This coupler, as is well known, allows, for example, two linearly polarized microwave signals to be introduced into the scanner in a quadrature spatial relationship.

One input to the scanner is the azimuth difference signal derived from circulator 6, and this signal is coupled through the side wave guide section 14 of the orthogonal mode coupler. Another input is the elevation difference signal from comparator 4 which is first supplied to one port 16 of a circulator 17 that has another port 18 connected to the end rectangular wave guide section 15 of the orthogonal coupler.

The azimuth and elevation difference signals are thus introduced into the scanner as linearly polarized signals having a quadrature spatial relationship, and these signals propagate down the circular wave guide section 9 towards the circular vane assembly. As vane 11 rotates, both reflected signals coming back down the circular wave guide section have their polarizations continuously rotated. Their quadrature spatial relationship, however, still persists. Varying amplitude components of both reflected signals are subsequently extracted at wave guide section 15 of the orthogonal coupler. Consequently, sinusoidally modulated output signals modulated at the rotational rate of vane 11 are produced.

One component of each reflected signal, of course, will pass out of the orthogonal coupler through side port 14. However, these components then enter circulator 6 and are diverted to load 7. Consequently, none of the reflected signal energy present in the scanner will reach comparator 4 or the horn assembly 1.

The sinusoidally modulated azimuth and elevation difference signals which leave scanner 8 via wave guide section 15 pass into a circulator 17 and proceed via port 19 thereof to a power divider 20. Another input to this power divider is the sum signal available from comparator 4. As a result of the action of power divider 20, the composite signal fed to microwave receiver 21 coupled thereto contains all of the target information developed by horn 1 and comparator 4, that is, the sum signal, the sense and magnitude of the azimuth difference signal, and the sense and magnitude of the elevation difference signal. More particularly, the input to microwave receiver 21 is a signal that is sinusoidally modulated at the frequency established by the rotational rate of the rotating vane in the scanner. The percentage modulation is proportional to the angular difference between the target direction and the antenna boresight. This difference may be designated the magnitude of the tracking error. The phase of this modulation with respect to the phase position of the vane is indicative of the directional sense of the tracking error. Thus, all of the necessary information to carry out a positional correction of the antenna assembly is present at the receiver input.

It will be appreciated that because of the very low mechanical inertia of the rotating vane of scanner 8, as compared, for example, to the conventional feedthrough half wavelength plates used as polarization rotators, the scanning rate of the receiving beam may be changed more rapidly. To accomplish this, of course, the motor drive 12 need only have appropriate control apparatus for varying its speed of rotation.

The composite signal fed to microwave receiver 21 should, of course, consist of the azimuth and elevation difference signal and the sum signal in superposition. To accomplish this, the various line lengths should be adjusted throughout the microwave portion of the system.

The output of microwave receiver 21 is fed to a suitable intermediate frequency amplifying circuit 22 and thereafter to a video detector 23. The output of this detector is fed to a pair of phase comparator circuits 24 and 25 which have as other inputs the quadraturely phased reference signals generated by a two-phase reference generator 26 driven by motor 12. Reference generator 26, as is well known, produces a pair of signals having a quadrature phase relationship and a frequency corresponding to the rotational rate of vane 11. The phase comparator circuits, in effect, allow the two harmonic components of the signal which correspond to the azimuth and elevation difference signals to be separated out for subsequent control of the elevation servo 28 and the azimuth servo 27. Each phase comparator, as is well known, produces a signal whose amplitude is linearly related to that component of the composite signal which is in phase with the reference signal applied thereto.

In the transmitting portion of the cycle, the microwave signal does not follow the same course through the apparatus because of the nonreciprocity of power divider 20 and the circulators 6 and 17. Most of the power from the transmitter 30 leaves the power divider 20 and is directed into the sum beam, that is, the action of comparator 4 results in most of the energy being equally divided among the four quadrants of horn 1. Some power does leave power divider 20 and is directed towards scanner 8, but most of this energy is diverted by circulator 17 out port 16 to the elevation difference line, causing a small and unobjectionable static deflection of the transmit beam. Load 31 absorbs miscellaneous signal energy produced by the interaction of the sum signal and the azimuth and elevation difference signals in the power divider wave guide assembly which is not required as an input to microwave receiver 21.

A small, residual amount of power does reach scanner 8 where it is modulated. Thereafter, it leaves via port 14 of the orthogonal mode coupler and proceeds towards the azimuth difference line. This energy, however, is again impeded by circulator 6, and additional attenuation of the amount of transmitted beam scanning occurs.

What is claimed is:

1. In a radar system of the type wherein the antenna apparatus comprises a quadrant horn and a comparator coupled thereto for developing a sum signal, an azimuth difference signal and an elevation difference signal in response to incident electromagnetic radiation returned from a target and the relationship between the direction of this target and the boresight of the horn, the combination of a microwave scanner including a hollow circular wave guide section having one end thereof closed off and containing a conducting vane rotatable about the longitudinal axis of symmetry of said wave section at a fixed distance from said closed end;

an orthogonal mode coupler attached to said scanner, said coupler having a first signal port for permitting a first linearly polarized microwave signal to be introduced into said scanner through a sidewall opening thereof and a second signal port for permitting a second linearly polarized microwave signal to be introduced into said scanner at the other end of said circular wave guide section in a quadrature spatial relationship with respect to said first signal;

means for coupling said azimuth difference signal to said first signal port and said elevation difference signal to said second signal port whereby a pair of quadaturely phased signals sinusoidally modulated at the rotational frequency of said vane appear at said second signal port of said coupler;

a power divider having a pair of input and output circuits;

means for coupling said sum signal and said pair of quadraturely phased signals to said input circuits thereby to develop at one output circuit a composite signal whose percentage modulation is proportional to the angular difference between said target direction and the antenna boresight and whose phase with respect to the angular position of said conducting vane is indicative of the directional sense of the tracking error between said target direction and said antenna boresight.

2. In an arrangement as defined in claim 1, a microwave receiver having an IF stage and a detector;

means for feeding said composite signal to the input of said microwave receiver;

a pair of phase comparators;

means for feeding the output of said detector to one input of each phase comparator;

means for generating a pair of quadraturely phased reference signals having a frequency corresponding to the rotational frequency of said conducting vane; and means for coupling one of each reference signals to a different one of the other inputs of each phase comparator thereby to produce azimuth and elevation error signals in the output thereof.

3. In an arrangement as defined in claim 1,
drive means for rotating said conducting vane;
a two-phase reference generator coupled to said drive means and operated thereby,
  said two-phase generator producing a pair of quadraturely related, sinusoidal signals whose frequency corresponds to the rotational frequency of said conducting vane.

4. In an arrangement as defined in claim 1 wherein
said means for coupling said azimuth difference signal to said microwave scanner includes a circulator having an input port and a pair of output ports; and
a load device connected to one of said output ports,
  said azimuth difference signal being coupled to said input port and the other output port being connected to said microwave scanner.

5. In an arrangement as defined in claim 4 wherein
said means for coupling said pair of quadraturely phased signals to said power divider includes a second circulator having an input port and a pair of output ports,
  said elevation difference signal being fed to said input port,
  one of said output ports being coupled to said microwave scanner, and
  the other of said output ports being connected to one input circuit of said power divider.

6. In an arrangement as defined in claim 1,
a radar transmitter is coupled to one output circuit of said power divider and
a load connected to the other output circuit of said power divider.

* * * * *